INVENTOR
VIRGIL L. SNOW
BY
Hyde, Meyer, Baldwin & Doran
ATTORNEYS

April 13, 1948.   V. L. SNOW   2,439,585
SEMISTATIONARY TAIL GATE FOR REAR DUMP BODIES
Filed Feb. 5, 1946   2 Sheets-Sheet 2

INVENTOR
VIRGIL L. SNOW
BY
Hyde, Meyer, Baldwin & Doran
ATTORNEYS

Patented Apr. 13, 1948

2,439,585

UNITED STATES PATENT OFFICE 2,439,585

SEMISTATIONARY TAIL GATE FOR REAR DUMP BODIES

Virgil L. Snow, Euclid, Ohio, assignor to The Euclid Road Machinery Co., Euclid, Ohio, a corporation of Ohio Application February 5, 1946, Serial No. 645,561

3 Claims. (Cl. 298—23)

This invention relates to improvements in a semi-stationary tail gate for a rear dump vehicle body.

An object of the present invention is to provide in combination with a vehicle body having a chute-like portion for discharging the vehicle load, a substantially stationary tail gate which will close the end of the chute when the body is in carrying position but which will not interfere with the automatic dumping of the load when the body is raised for such an operation.

Other objects and advantages of the invention are found in the arrangement of the parts so that they properly coact with each other to carry out the above described purpose, and the essential features of my improved construction will be set forth in the appended claims.

In the drawings,

Fig. 4 is a rear elevational view of the vehicle of Fig. 2 taken at the right-hand end of Fig. 2; while

Figure 1:
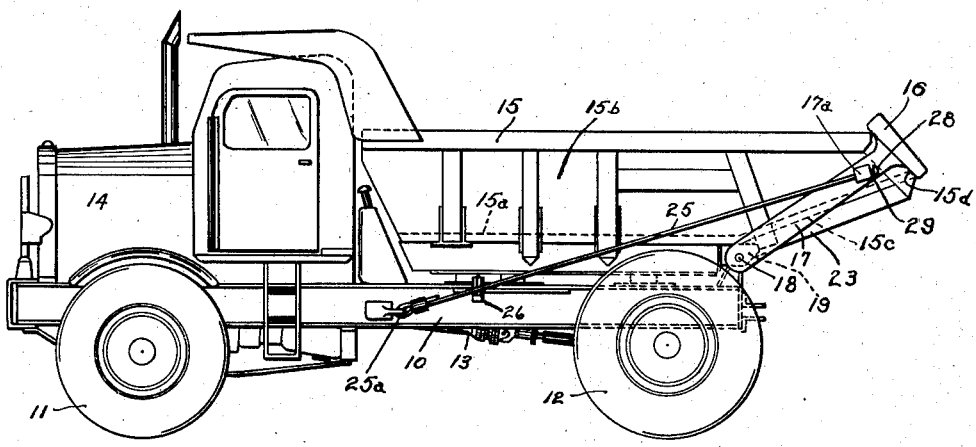
Fig. 1 is a side elevational view showing a vehicle equipped with my improvement.

In Fig. 1, I have shown one embodiment of my invention wherein an automotive vehicle having a frame 10 is supported by a pair of front wheels 11, and a pair of rear wheels 12 which are driven through propeller shaft 13 by means of an engine enclosed in the hood 14. The vehicle has a dumping body 15 having a bottom 15a and side walls 15b. The rear portion of this body is a chute-like arrangement formed by the rear end of the bottom of the body sloping upwardly, as indicated at 15c, between the side walls so as to form a chute having an open end 15d. This type of body, without further attachments, is sufficient for many hauling purposes. However, when hauling certain materials, especially up hill, such as very wet materials, there is a tendency for the material to be lost out the open end 15d of the dumping chute. It is an object of the present invention to overcome this difficulty in such a manner that the vehicle operator need pay no attention to the improved device but merely operates the vehicle and the dumping operation thereof, in the usual manner.

Figure 3:
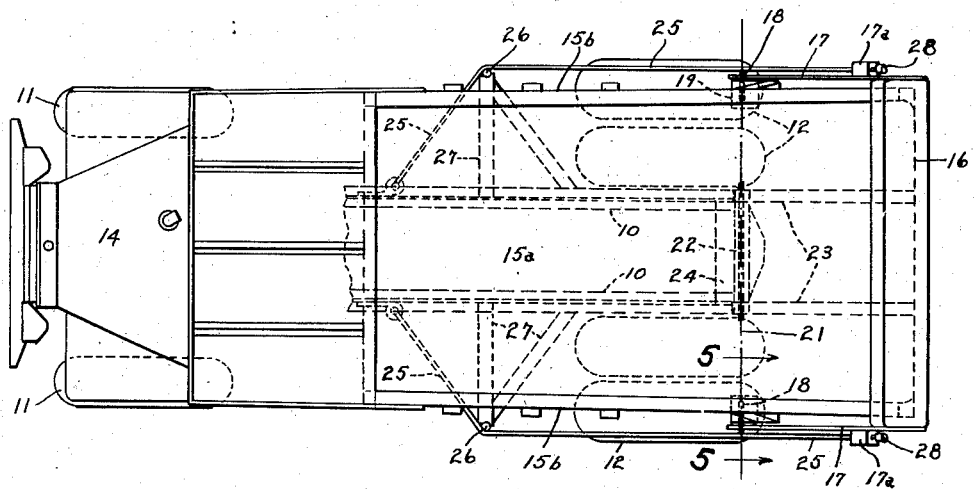
Fig. 3 is a top plan view of the vehicle shown in Fig. 1.
Figure 4:
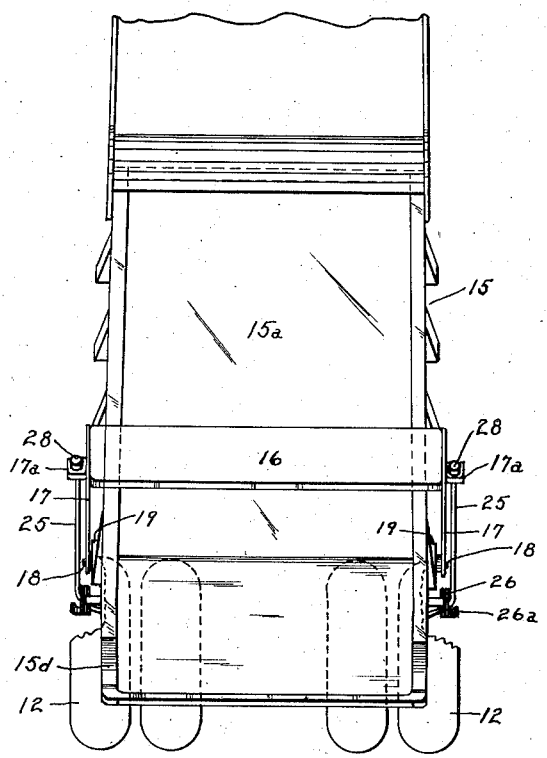
Figure 5:
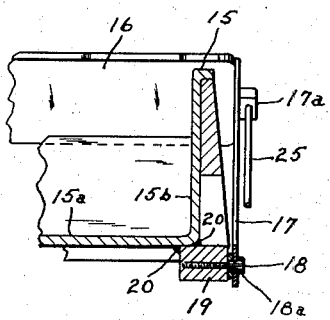
Fig. 5 is an enlarged fragmental sectional view taken along the line 5—5 of Fig. 3.

My improvement comprises a tail gate 16 so positioned on the vehicle frame that it completely closes the open end 15d of the discharge chute when the body is in carrying position, as shown in Figs. 1 and 3. It will be noted that the open end of this chute is in a plane extending rearwardly and downwardly at an angle of approximately 45 degrees and the inner face of the tail gate is disposed in this same plane so as to completely close the chute. The tail gate is supported on a pair of parallel arms 17 which are rigidly connected with the ends of the tail gate and extend forwardly and downwardly to pivotal mountings on the pivot pins 18. As best seen in Fig. 5, each of these pins is threaded into a metallic plate or block 19, which is welded at 20 to the body 15. Each pin has a shoulder portion 18a on which the arm 17 is rotatably mounted.

Preferably, the pins 18 are mounted on the axis 21 which is common to the pins 18 and to the hinge pin 22 which pivotally connects the body ribs 23 with the hinge bracket 24 mounted on frame 10. While this is my preferred construction it should be understood that some variation from this is permitted so long as the arc of movement of the end 15d of the chute will cause the same to engage the face of the tail gate 16 when the body is in the position of Fig. 1.

Figure 2:
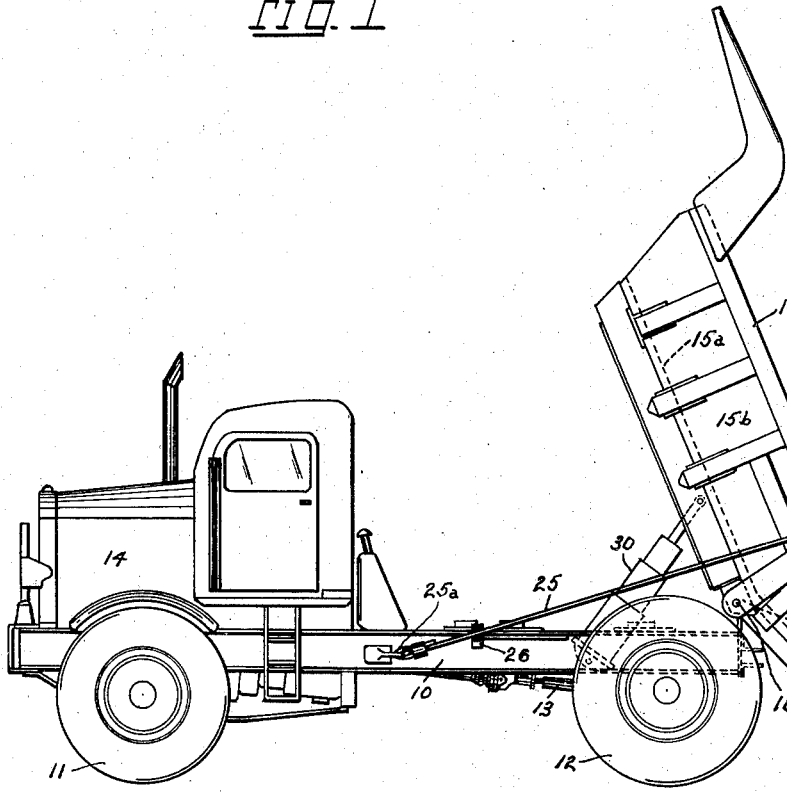
Fig. 2 is a similar view showing the vehicle body raised to dumping position.

Means is provided for holding the tail gate in the position of Fig. 2 when the vehicle body is dumped. The means here shown comprises a pair of cables 25, one for each arm 17. Each of these cables is fixed to the vehicle frame at its inner end 25a where a loop in the cable is fastened to a hook or ring on the vehicle body. The cable then passes outwardly around a supporting pin 26 which is held by means of a bracket 27 fastened to the frame. Preferably, the pin has an outwardly extending bottom projection 26a to prevent the dropping of the cable. The rear end of each cable passes through a sleeve 17a rigid with its associated arm 17 and the rear end of each cable is provided with a button 28 to prevent the withdrawal of the cable through the sleeve 17a.

Preferably, when the body 15 is in carrying position, as shown in Fig. 1, the rear end of the chute lifts the tail gate 16 slightly upwardly and in a counter-clockwise direction around the pins 18 leaving a slight gap 29 between the button 28 and the sleeve 17a. Where the vehicle body is of a size to hold ten to fifteen tons of earth material, the tail gate may be raised as much as say two inches from the position of Fig. 2, to that shown in Fig. 1.

In the dumping operation, a hydraulic jack 30 is operated by means not shown, under the control of the operator to raise the body to dumping position, as shown in Fig. 2. As the end of the chute 15d starts to move downwardly from the position of Fig. 1 toward that of Fig. 2, the tail gate 16 moves very slightly in a clockwise direction about the pins 18 until the button 28 strikes the sleeve 17a arresting the movement of the gate. The vehicle body continues to tilt in a clockwise direction about the pivotal axis 21 so as to dump the load in the body. During this operation the vehicle operator need pay no attention to the tail gate, as it remains in the position of Fig. 2 entirely clear of the dumping load. For instance, in the heavy duty vehicle mentioned above, where the vehicle body is of a depth of 2½ to 3 feet the gate 16 in the position of Fig. 2 will clear the side walls 15b by approximately one foot. This gives ample clearance for the dumping of the load. When the operator returns the body to the position of Fig. 1, the rear end is again automatically closed.

What I claim is:

1. In combination a vehicle frame, a body pivotally mounted near the rear end thereof on the rear end of said frame on a pivotal axis extending transversely of said vehicle whereby said body is mounted for movement from a generally horizontal carrying position to a tilted dumping position, said body having a bottom including a portion sloping rearwardly and upwardly from a zone adjacent said axis, said body having side walls extending upwardly from said bottom to form an open top body with a chute portion at the rear end thereof, said side walls and bottom portion ending in a plane sloping downwardly and rearwardly at an angle to the horizontal when said body is in carrying position to provide an open end for dumping body contents, a tail gate in position for closing said open end when said body is in carrying position, arms supporting said gate and pivotally mounted on said vehicle substantially on said axis, and means connected with said vehicles for holding said gate substantially in its said position when said body is tilted to dumping position.

2. In a vehicle having a frame and an open-top body supported thereby said body in carrying position having a bottom sloping upwardly and rearwardly at its rear end and having side walls extending to the rear end of said bottom, whereby said bottom and side walls form a discharge chute at the rear end of said body, said body pivoted near its rear end on said frame on an axis transversely of said vehicle for tilting to dumping position to discharge the body contents, the combination of a tail gate positioned to form an upward extension for said bottom at its rear end when said body is in carrying position, arms supporting said gate in said position, said arms being pivotally mounted on said frame adjacent said axis, said arms being longer than the vertical extent of said side walls, and means holding said arms in said gate-supporting position.

3. The combination of claim 2 wherein said gate is engaged and lifted by said bottom when said body is in carrying position, and said last named means limits downward movement of said gate to a very slight amount while permitting upward movement of said gate when engaged by said bottom.

VIRGIL L. SNOW.

REFERENCES CITED

The following references are of record in the file of this patent:

UNITED STATES PATENTS

| Number | Name | Date |
|---|---|---|
| 1,709,364 | Nelson | Apr. 16, 1929 |
| 1,727,271 | Burns | Sept. 3, 1929 |

FOREIGN PATENTS

| Number | Country | Date |
|---|---|---|
| 664-26 | Australia | Jan. 5, 1927 |